United States Patent
Fromm et al.

(10) Patent No.: US 6,995,646 B1
(45) Date of Patent: Feb. 7, 2006

(54) TRANSFORMER WITH VOLTAGE REGULATING MEANS

(75) Inventors: Udo Fromm, Vasteras (SE); Par Holmberg, Vasteras (SE); Albert Jaksts, Vasteras (SE); Mats Leijon, Vasteras (SE); Christian Sasse, Vasteras (SE); Thorsten Schutte, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/355,726

(22) PCT Filed: Feb. 2, 1998

(86) PCT No.: PCT/SE98/00151

§ 371 (c)(1),
(2), (4) Date: Nov. 1, 1999

(87) PCT Pub. No.: WO98/34249

PCT Pub. Date: Aug. 6, 1998

(30) Foreign Application Priority Data

Feb. 3, 1997  (SE) .................................. 9700335
Nov. 28, 1997 (SE) .................................. 9704453

(51) Int. Cl.
*H01F 27/30* (2006.01)
(52) U.S. Cl. ............... 336/206; 174/110 R; 174/105 R
(58) Field of Classification Search ............... 336/212, 336/206; 174/15.1, 14 R, 102 SC
See application file for complete search history.

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |

(Continued)

FOREIGN PATENT DOCUMENTS

AT                399790           7/1995

(Continued)

OTHER PUBLICATIONS

Shipboard Electrical Insulation; G. L. Moses, 1951, pp2&3.

(Continued)

*Primary Examiner*—Anh Mai
(74) *Attorney, Agent, or Firm*—Oblon, Spivak, McClelland, Maier & Neustadt, P.C.

(57) ABSTRACT

A power or regulating transformer with voltage regulator includes regulating windings made of a flexible conductor having an electric field containing mechanism that forces the electric field due to the current in the winding to be contained within the flexible conductor. Since virtually no electric field is to be found outside the flexible conductor of the regulating winding, the regulating winding may be formed without having to consider the electric field distribution, thus providing for a transformer with a favorable regulating winding design.

8 Claims, 3 Drawing Sheets

U.S. PATENT DOCUMENTS

| | | |
|---|---|---|
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,710,293 A * | 1/1973 | Lazor .................. 336/198 |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A | 12/1981 | Schuler |
| 4,308,575 A | 12/1981 | Mase |
| 4,310,966 A | 1/1982 | Brietenbach |
| 4,314,168 A | 2/1982 | Breitenbach |
| 4,317,001 A | 2/1982 | Silver et al. |

| | | | | | | |
|---|---|---|---|---|---|---|
| 4,320,645 A | 3/1982 | Stanley | | 4,692,731 A | 9/1987 | Osinga |
| 4,321,426 A | 3/1982 | Schaeffer | | 4,723,083 A | 2/1988 | Elton |
| 4,321,518 A | 3/1982 | Akamatsu | | 4,723,104 A | 2/1988 | Rohatyn |
| 4,326,181 A | 4/1982 | Allen | | 4,724,345 A | 2/1988 | Elton et al. |
| 4,330,726 A | 5/1982 | Albright et al. | | 4,732,412 A | 3/1988 | van der Linden et al. |
| 4,335,367 A * | 6/1982 | Mitsui et al. ............... 336/205 | | 4,737,704 A | 4/1988 | Kalinnikov et al. |
| 4,337,922 A | 7/1982 | Streiff et al. | | 4,745,314 A | 5/1988 | Nakano |
| 4,341,989 A | 7/1982 | Sandberg et al. | | 4,761,602 A | 8/1988 | Leibovich |
| 4,347,449 A | 8/1982 | Beau | | 4,766,365 A | 8/1988 | Bolduc et al. |
| 4,347,454 A | 8/1982 | Gellert et al. | | 4,771,168 A | 9/1988 | Gundersen et al. |
| 4,357,542 A | 11/1982 | Kirschbaum | | 4,785,138 A | 11/1988 | Brietenbach et al. |
| 4,360,748 A | 11/1982 | Raschbichler et al. | | 4,795,933 A | 1/1989 | Sakai |
| 4,361,723 A | 11/1982 | Hvizd, Jr. et al. | | 4,818,909 A * | 4/1989 | Balke ........................ 310/208 |
| 4,363,612 A | 12/1982 | Meyers | | 4,827,172 A | 5/1989 | Kobayashi |
| 4,365,178 A | 12/1982 | Lexz | | 4,845,308 A | 7/1989 | Womack, Jr. et al. |
| 4,367,425 A | 1/1983 | Mendelsohn et al. | | 4,847,747 A | 7/1989 | Abbondanti |
| 4,367,890 A | 1/1983 | Spirk | | 4,853,565 A | 8/1989 | Elton et al. |
| 4,368,418 A | 1/1983 | Demello et al. | | 4,859,810 A | 8/1989 | Cloetens et al. |
| 4,369,389 A | 1/1983 | Lambrecht | | 4,859,989 A | 8/1989 | McPherson |
| 4,371,745 A | 2/1983 | Sakashita | | 4,860,430 A | 8/1989 | Raschbichler et al. |
| 4,384,944 A | 5/1983 | Silver et al. | | 4,864,266 A | 9/1989 | Feather et al. |
| 4,387,316 A | 6/1983 | Katsekas | | 4,883,230 A | 11/1989 | Lindstrom |
| 4,401,920 A | 8/1983 | Taylor et al. | | 4,890,040 A | 12/1989 | Gundersen |
| 4,403,163 A | 9/1983 | Rarmerding et al. | | 4,894,284 A | 1/1990 | Yamanouchi et al. |
| 4,404,486 A | 9/1983 | Keim et al. | | 4,914,386 A | 4/1990 | Zocholl |
| 4,411,710 A | 10/1983 | Mochizuki et al. | | 4,918,347 A | 4/1990 | Takaba |
| 4,421,284 A | 12/1983 | Pan | | 4,918,835 A | 4/1990 | Raschbichler et al. |
| 4,425,521 A | 1/1984 | Rosenberry, Jr. et al. | | 4,924,342 A | 5/1990 | Lee |
| 4,426,771 A | 1/1984 | Wang et al. | | 4,926,079 A | 5/1990 | Niemela et al. |
| 4,429,244 A | 1/1984 | Nikiten et al. | | 4,942,326 A | 7/1990 | Butler, III et al. |
| 4,431,960 A | 2/1984 | Zucker | | 4,949,001 A | 8/1990 | Campbell |
| 4,432,029 A | 2/1984 | Lundqvist | | 4,982,147 A | 1/1991 | Lauw |
| 4,437,464 A | 3/1984 | Crow | | 4,994,952 A | 2/1991 | Silva et al. |
| 4,443,725 A | 4/1984 | Derderian et al. | | 4,997,995 A | 3/1991 | Simmons et al. |
| 4,470,884 A | 9/1984 | Carr | | 5,012,125 A | 4/1991 | Conway |
| 4,473,765 A | 9/1984 | Butman, Jr. et al. | | 5,030,813 A | 7/1991 | Stanisz |
| 4,475,075 A | 10/1984 | Munn | | 5,036,165 A | 7/1991 | Elton et al. |
| 4,477,690 A | 10/1984 | Nikitin et al. | | 5,036,238 A | 7/1991 | Tajima |
| 4,481,438 A | 11/1984 | Keim | | 5,066,881 A | 11/1991 | Elton et al. |
| 4,484,106 A | 11/1984 | Taylor et al. | | 5,067,046 A | 11/1991 | Elton et al. |
| 4,488,079 A | 12/1984 | Dailey et al. | | 5,083,360 A | 1/1992 | Valencic et al. |
| 4,490,651 A | 12/1984 | Taylor et al. | | 5,086,246 A | 2/1992 | Dymond et al. |
| 4,503,284 A | 3/1985 | Minnick et al. | | 5,091,609 A | 2/1992 | Sawada et al. |
| 4,508,251 A | 4/1985 | Harada et al. | | 5,094,703 A | 3/1992 | Takaoka et al. |
| 4,510,077 A | 4/1985 | Elton | | 5,095,175 A | 3/1992 | Yoshida et al. |
| 4,517,471 A | 5/1985 | Sachs | | 5,097,241 A | 3/1992 | Smith et al. |
| 4,520,287 A | 5/1985 | Wang et al. | | 5,097,591 A | 3/1992 | Wcislo et al. |
| 4,523,249 A | 6/1985 | Arimoto | | 5,111,095 A | 5/1992 | Hendershot |
| 4,538,131 A | 8/1985 | Baier et al. | | 5,124,607 A | 6/1992 | Rieber et al. |
| 4,546,210 A | 10/1985 | Akiba et al. | | 5,136,459 A | 8/1992 | Fararooy |
| 4,551,780 A | 11/1985 | Canay | | 5,140,290 A | 8/1992 | Dersch |
| 4,552,990 A | 11/1985 | Persson et al. | | 5,153,460 A | 10/1992 | Bovino et al. |
| 4,557,038 A | 12/1985 | Wcislo et al. | | 5,168,662 A | 12/1992 | Nakamura et al. |
| 4,560,896 A | 12/1985 | Vogt et al. | | 5,171,941 A | 12/1992 | Shimizu et al. |
| 4,565,929 A | 1/1986 | Baskin et al. | | 5,175,396 A | 12/1992 | Emery et al. |
| 4,571,453 A | 2/1986 | Takaoka et al. | | 5,182,537 A | 1/1993 | Thuis |
| 4,588,916 A | 5/1986 | Lis | | 5,187,428 A | 2/1993 | Hutchison et al. |
| 4,590,416 A | 5/1986 | Porche et al. | | 5,231,249 A | 7/1993 | Kimura et al. |
| 4,594,630 A | 6/1986 | Rabinowitz et al. | | 5,235,488 A | 8/1993 | Koch |
| 4,607,183 A | 8/1986 | Rieber et al. | | 5,246,783 A | 9/1993 | Spenadel et al. |
| 4,615,109 A | 10/1986 | Wcislo et al. | | 5,264,778 A | 11/1993 | Kimmel et al. |
| 4,615,778 A | 10/1986 | Elton | | 5,287,262 A | 2/1994 | Klein |
| 4,618,795 A | 10/1986 | Cooper et al. | | 5,293,146 A | 3/1994 | Aosaki et al. |
| 4,619,040 A | 10/1986 | Wang et al. | | 5,304,883 A | 4/1994 | Denk |
| 4,622,116 A | 11/1986 | Elton et al. | | 5,305,961 A | 4/1994 | Errard et al. |
| 4,633,109 A | 12/1986 | Feigel | | 5,321,308 A | 6/1994 | Johncock |
| 4,650,924 A | 3/1987 | Kauffman et al. | | 5,323,330 A | 6/1994 | Asplund et al. |
| 4,652,963 A | 3/1987 | Fahlen | | 5,325,008 A | 6/1994 | Grant |
| 4,656,316 A | 4/1987 | Meltsch | | 5,325,259 A | 6/1994 | Paulsson |
| 4,656,379 A | 4/1987 | McCarty | | 5,327,637 A | 7/1994 | Britenbach et al. |
| 4,663,603 A | 5/1987 | van Riemsdijk et al. | | 5,341,281 A | 8/1994 | Skibinski |
| 4,677,328 A | 6/1987 | Kumakura | | 5,343,139 A | 8/1994 | Gyugyi et al. |
| 4,687,882 A | 8/1987 | Stone et al. | | 5,355,046 A | 10/1994 | Weigelt |

| | | | | | | |
|---|---|---|---|---|---|---|
| 5,365,132 | A | 11/1994 | Hann et al. | DE | 1807391 | 5/1970 |
| 5,387,890 | A | 2/1995 | Estop et al. | DE | 2050674 | 5/1971 |
| 5,397,513 | A | 3/1995 | Steketee, Jr. | DE | 1638176 | 6/1971 |
| 5,399,941 | A | 3/1995 | Grothaus et al. | DE | 2155371 | 5/1973 |
| 5,400,005 | A | 3/1995 | Bobry | DE | 2400698 | 7/1975 |
| 5,408,169 | A | 4/1995 | Jeanneret | DE | 2520511 | 11/1976 |
| 5,449,861 | A | 9/1995 | Fujino et al. | DE | 2656389 | 6/1978 |
| 5,452,170 | A | 9/1995 | Ohde et al. | DE | 2721905 | 11/1978 |
| 5,468,916 | A | 11/1995 | Litenas et al. | DE | 2824951 | 12/1979 |
| 5,499,178 | A | 3/1996 | Mohan | DE | 2835386 | 2/1980 |
| 5,500,632 | A | 3/1996 | Halser, III | DE | 2839517 | 3/1980 |
| 5,504,469 | A * | 4/1996 | McGrane .................. 336/206 | DE | 2854520 | 6/1980 |
| 5,510,942 | A | 4/1996 | Bock et al. | DE | 3009102 | 9/1980 |
| 5,530,307 | A | 6/1996 | Horst | DE | 2913697 | 10/1980 |
| 5,533,658 | A | 7/1996 | Benedict et al. | DE | 2920478 | 12/1980 |
| 5,534,754 | A | 7/1996 | Poumey | DE | 3028777 | 3/1981 |
| 5,545,853 | A | 8/1996 | Hildreth | DE | 2939004 | 4/1981 |
| 5,550,410 | A | 8/1996 | Titus | DE | 3006382 | 8/1981 |
| 5,561,410 | A * | 10/1996 | Toki ......................... 336/200 | DE | 3008818 | 9/1981 |
| 5,583,387 | A | 12/1996 | Takeuchi et al. | DE | 209313 | 4/1984 |
| 5,587,126 | A | 12/1996 | Steketee, Jr. | DE | 3305225 | 8/1984 |
| 5,598,137 | A | 1/1997 | Alber et al. | DE | 3309051 | 9/1984 |
| 5,607,320 | A | 3/1997 | Wright | DE | 3441311 | 5/1986 |
| 5,612,510 | A | 3/1997 | Hildreth | DE | 3543106 | 6/1987 |
| 5,663,605 | A | 9/1997 | Evans et al. | DE | 2917717 | 8/1987 |
| 5,672,926 | A | 9/1997 | Brandes et al. | DE | 3612112 | 10/1987 |
| 5,689,223 | A | 11/1997 | Demarmels et al. | DE | 3726346 | 2/1989 |
| 5,807,447 | A | 9/1998 | Forrest | DE | 3925337 | 2/1991 |
| 5,834,699 | A | 11/1998 | Buck et al. | DE | 4023903 | 11/1991 |
| | | | | DE | 4022476 | 1/1992 |
| | | FOREIGN PATENT DOCUMENTS | | DE | 4233558 | 3/1994 |
| | | | | DE | 4402184 | 8/1995 |
| BE | | 565063 | 2/1957 | DE | 4409794 | 8/1995 |
| CH | | 391071 | 4/1965 | DE | 4412761 | 10/1995 |
| CH | | SU266037 | 10/1965 | DE | 4420322 | 12/1995 |
| CH | | 534448 | 2/1973 | DE | 19620906 | 1/1996 |
| CH | | 539328 | 7/1973 | DE | 4438186 | 5/1996 |
| CH | | SU646403 | 2/1979 | DE | 19020222 | 3/1997 |
| CH | | 657482 | 8/1986 | DE | 19547229 | 6/1997 |
| CH | | SU1189322 | 10/1986 | DE | 468827 | 7/1997 |
| DD | | 137164 | 8/1979 | EP | 049104 | 4/1982 |
| DD | | 138840 | 11/1979 | EP | 0493704 | 4/1982 |
| DE | | 40414 | 8/1887 | EP | 0056580 A1 | 7/1982 |
| DE | | 134022 | 12/1901 | EP | 078908 | 5/1983 |
| DE | | 277012 | 7/1914 | EP | 0120154 | 10/1984 |
| DE | | 336418 | 6/1920 | EP | 0130124 | 1/1985 |
| DE | | 386561 | 12/1923 | EP | 0142813 | 5/1985 |
| DE | | 387973 | 1/1924 | EP | 0155405 | 9/1985 |
| DE | | 406371 | 11/1924 | EP | 0102513 | 1/1986 |
| DE | | 425551 | 2/1926 | EP | 0174783 | 3/1986 |
| DE | | 426793 | 3/1926 | EP | 0185788 | 7/1986 |
| DE | | 432169 | 7/1926 | EP | 0277358 | 8/1986 |
| DE | | 433749 | 9/1926 | EP | 0234521 | 9/1987 |
| DE | | 435608 | 10/1926 | EP | 0244069 | 11/1987 |
| DE | | 435609 | 10/1926 | EP | 0246377 | 11/1987 |
| DE | | 441717 | 3/1927 | EP | 0265868 | 5/1988 |
| DE | | 443011 | 4/1927 | EP | 0274691 | 7/1988 |
| DE | | 460124 | 5/1928 | EP | 0280759 | 9/1988 |
| DE | | 482506 | 9/1929 | EP | 0282876 | 9/1988 |
| DE | | 501181 | 7/1930 | EP | 0309096 | 3/1989 |
| DE | | 523047 | 4/1931 | EP | 0314860 | 5/1989 |
| DE | | 568508 | 1/1933 | EP | 0316911 | 5/1989 |
| DE | | 572030 | 3/1933 | EP | 0317248 | 5/1989 |
| DE | | 584639 | 9/1933 | EP | 0335430 | 10/1989 |
| DE | | 586121 | 10/1933 | EP | 0342554 | 11/1989 |
| DE | | 604972 | 11/1934 | EP | 0221404 | 5/1990 |
| DE | | 629301 | 4/1936 | EP | 0375101 | 6/1990 |
| DE | | 673545 | 3/1939 | EP | 0406437 | 1/1991 |
| DE | | 719009 | 3/1942 | EP | 0439410 | 7/1991 |
| DE | | 846583 | 8/1952 | EP | 0440865 | 8/1991 |
| DE | | 875227 | 4/1953 | EP | 0469155 A1 | 2/1992 |
| DE | | 975999 | 1/1963 | EP | 0490705 | 6/1992 |
| DE | | 1465719 | 5/1969 | EP | 0503817 | 9/1992 |

| | | | | | |
|---|---|---|---|---|---|
| EP | 0571155 | 11/1993 | GB | 1322433 | 7/1973 |
| EP | 0620570 | 10/1994 | GB | 1340983 | 12/1973 |
| EP | 0620630 | 10/1994 | GB | 1341050 | 12/1973 |
| EP | 0642027 | 3/1995 | GB | 1365191 | 8/1974 |
| EP | 0671632 | 9/1995 | GB | 1395152 | 5/1975 |
| EP | 0676777 | 10/1995 | GB | 1424982 | 2/1976 |
| EP | 0677915 | 10/1995 | GB | 1426594 | 3/1976 |
| EP | 0684679 | 11/1995 | GB | 1438610 | 6/1976 |
| EP | 0684682 | 11/1995 | GB | 1445284 | 8/1976 |
| EP | 0695019 | 1/1996 | GB | 1479904 | 7/1977 |
| EP | 0732787 | 9/1996 | GB | 1493163 | 11/1977 |
| EP | 0738034 | 10/1996 | GB | 1502938 | 3/1978 |
| EP | 0739087 A2 | 10/1996 | GB | 1525745 | 9/1978 |
| EP | 0740315 | 10/1996 | GB | 2000625 | 1/1979 |
| EP | 0749190 A2 | 12/1996 | GB | 1548633 | 7/1979 |
| EP | 0751605 | 1/1997 | GB | 2 018 521 | 10/1979 |
| EP | 0739087 A3 | 3/1997 | GB | 2046142 | 11/1979 |
| EP | 0749193 A3 | 3/1997 | GB | 2022327 | 12/1979 |
| EP | 0780926 | 6/1997 | GB | 2025150 | 1/1980 |
| EP | 0802542 | 10/1997 | GB | 2034101 | 5/1980 |
| EP | 0913912 A1 | 5/1999 | GB | 1574796 | 9/1980 |
| FR | 805544 | 4/1936 | GB | 2070341 | 9/1981 |
| FR | 841351 | 1/1938 | GB | 2070470 | 9/1981 |
| FR | 847899 | 12/1938 | GB | 2071433 | 9/1981 |
| FR | 916959 | 12/1946 | GB | 2081523 | 2/1982 |
| FR | 1011924 | 4/1949 | GB | 2099635 | 12/1982 |
| FR | 1126975 | 3/1955 | GB | 2105925 | 3/1983 |
| FR | 1238795 | 7/1959 | GB | 2106306 | 4/1983 |
| FR | 2108171 | 5/1972 | GB | 2106721 | 4/1983 |
| FR | 2251938 | 6/1975 | GB | 2136214 | 9/1984 |
| FR | 2305879 | 10/1976 | GB | 2140195 | 11/1984 |
| FR | 2376542 | 7/1978 | GB | 2150153 | 6/1985 |
| FR | 2467502 | 4/1981 | GB | 2268337 | 1/1994 |
| FR | 2481531 | 10/1981 | GB | 2273819 | 6/1994 |
| FR | 2556146 | 6/1985 | GB | 2283133 | 4/1995 |
| FR | 2594271 | 8/1987 | GB | 2289992 | 12/1995 |
| FR | 2708157 | 1/1995 | GB | 2308490 | 6/1997 |
| GB | 123906 | 3/1919 | GB | 2332557 | 6/1999 |
| GB | 268271 | 3/1927 | HU | 175494 | 11/1981 |
| GB | 293861 | 11/1928 | JP | 60206121 | 3/1959 |
| GB | 292999 | 4/1929 | JP | 57043529 | 8/1980 |
| GB | 319313 | 7/1929 | JP | 57126117 | 5/1982 |
| GB | 518993 | 3/1940 | JP | 59076156 | 10/1982 |
| GB | 537609 | 6/1941 | JP | 59159642 | 2/1983 |
| GB | 540456 | 10/1941 | JP | 6264964 | 9/1985 |
| GB | 589071 | 6/1947 | JP | 1129737 | 5/1989 |
| GB | 666883 | 2/1952 | JP | 62320631 | 6/1989 |
| GB | 685416 | 1/1953 | JP | 2017474 | 1/1990 |
| GB | 702892 | 1/1954 | JP | 3245748 | 2/1990 |
| GB | 715226 | 9/1954 | JP | 4179107 | 11/1990 |
| GB | 723457 | 2/1955 | JP | 318253 | 1/1991 |
| GB | 739962 | 11/1955 | JP | 424909 | 1/1992 |
| GB | 763761 | 12/1956 | JP | 5290947 | 4/1992 |
| GB | 805721 | 12/1958 | JP | 6196343 | 12/1992 |
| GB | 827600 | 2/1960 | JP | 6233442 | 2/1993 |
| GB | 854728 | 11/1960 | JP | 6325629 | 5/1993 |
| GB | 870583 | 6/1961 | JP | 7057951 | 8/1993 |
| GB | 913386 | 12/1962 | JP | 7264789 | 3/1994 |
| GB | 965741 | 8/1964 | JP | 8167332 | 12/1994 |
| GB | 992249 | 5/1965 | JP | 7161270 | 6/1995 |
| GB | 1024583 | 3/1966 | JP | 8264039 | 11/1995 |
| GB | 1053337 | 12/1966 | JP | 9200989 | 1/1996 |
| GB | 1059123 | 2/1967 | JP | 8036952 | 2/1996 |
| GB | 1103098 | 2/1968 | JP | 8167360 | 6/1996 |
| GB | 1103099 | 2/1968 | LU | 67199 | 3/1972 |
| GB | 1117401 | 6/1968 | SE | 90308 | 9/1937 |
| GB | 1135242 | 12/1968 | SE | 305899 | 11/1968 |
| GB | 1147049 | 4/1969 | SE | 255156 | 2/1969 |
| GB | 1157885 | 7/1969 | SE | 341428 | 12/1971 |
| GB | 1174659 | 12/1969 | SE | 453236 | 1/1982 |
| GB | 1236082 | 6/1971 | SE | 457792 | 6/1987 |
| GB | 1268770 | 3/1972 | SE | 502417 | 12/1993 |
| GB | 1319257 | 6/1973 | SU | 792302 | 1/1971 |

| | | | | | | |
|---|---|---|---|---|---|---|
| SU | 425268 | 9/1974 | | WO | FR 98/00468 | 6/1998 |
| SU | 1019553 | 1/1980 | | WO | WO9827634 | 6/1998 |
| SU | 694939 | 1/1982 | | WO | WO9827635 | 6/1998 |
| SU | 955369 | 8/1983 | | WO | WO9827636 | 6/1998 |
| SU | 1511810 | 5/1987 | | WO | WO9829927 | 7/1998 |
| WO | WO8202617 | 8/1982 | | WO | WO9829928 | 7/1998 |
| WO | WO8502302 | 5/1985 | | WO | WO9829929 | 7/1998 |
| WO | WO9011389 | 10/1990 | | WO | WO9829930 | 7/1998 |
| WO | WO9012409 | 10/1990 | | WO | WO9829931 | 7/1998 |
| WO | DE 90/00279 | 11/1990 | | WO | WO9829932 | 7/1998 |
| WO | WO9101059 | 1/1991 | | WO | WO 98/34239 | 8/1998 |
| WO | WO9101585 | 2/1991 | | WO | WO9833731 | 8/1998 |
| WO | WO9107807 | 3/1991 | | WO | WO9833736 | 8/1998 |
| WO | SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO9834240 | 8/1998 |
| WO | WO 91/15755 | 10/1991 | | WO | WO9834241 | 8/1998 |
| WO | WO8115862 | 10/1991 | | WO | WO9834242 | 8/1998 |
| WO | WO9201328 | 1/1992 | | WO | WO9834243 | 8/1998 |
| WO | WO9203870 | 3/1992 | | WO | WO9834244 | 8/1998 |
| WO | WO9321681 | 10/1993 | | WO | WO9834245 | 8/1998 |
| WO | WO9406194 | 3/1994 | | WO | WO9834246 | 8/1998 |
| WO | WO9518058 | 7/1995 | | WO | WO9834247 | 8/1998 |
| WO | WO9522153 | 8/1995 | | WO | WO9834248 | 8/1998 |
| WO | WO9524049 | 9/1995 | | WO | WO9834249 | 8/1998 |
| WO | WO9622606 | 7/1996 | | WO | WO9834250 | 8/1998 |
| WO | WO9622607 | 7/1996 | | WO | WO9834309 | 8/1998 |
| WO | CN 96/00010 | 10/1996 | | WO | WO9834312 | 8/1998 |
| WO | WO9630144 | 10/1996 | | WO | WO9834315 | 8/1998 |
| WO | WO9710640 | 3/1997 | | WO | WO9834321 | 8/1998 |
| WO | WO9711831 | 4/1997 | | WO | WO9834322 | 8/1998 |
| WO | WO9716881 | 5/1997 | | WO | WO9834323 | 8/1998 |
| WO | WO 97/29494 | 8/1997 | | WO | WO9834325 | 8/1998 |
| WO | WO 97/45908 | 12/1997 | | WO | WO9834326 | 8/1998 |
| WO | WO9745288 | 12/1997 | | WO | WO9834327 | 8/1998 |
| WO | WO9745847 | 12/1997 | | WO | WO9834328 | 8/1998 |
| WO | WO9745848 | 12/1997 | | WO | WO9834329 | 8/1998 |
| WO | WO9745906 | 12/1997 | | WO | WO9834330 | 8/1998 |
| WO | WO9745907 | 12/1997 | | WO | WO9834331 | 8/1998 |
| WO | WO9745912 | 12/1997 | | WO | WO 98/40627 | 9/1998 |
| WO | WO9745914 | 12/1997 | | WO | WO 98/43336 | 10/1998 |
| WO | WO9745915 | 12/1997 | | WO | WO9917309 | 4/1999 |
| WO | WO9745916 | 12/1997 | | WO | WO9917311 | 4/1999 |
| WO | WO9745918 | 12/1997 | | WO | WO9917312 | 4/1999 |
| WO | WO9745919 | 12/1997 | | WO | WO9917313 | 4/1999 |
| WO | WO9745920 | 12/1997 | | WO | WO9917314 | 4/1999 |
| WO | WO9745921 | 12/1997 | | WO | WO9917315 | 4/1999 |
| WO | WO9745922 | 12/1997 | | WO | WO9917316 | 4/1999 |
| WO | WO9745923 | 12/1997 | | WO | WO9917422 | 4/1999 |
| WO | WO9745924 | 12/1997 | | WO | WO9917424 | 4/1999 |
| WO | WO9745925 | 12/1997 | | WO | WO9917425 | 4/1999 |
| WO | WO9745926 | 12/1997 | | WO | WO9917426 | 4/1999 |
| WO | WO9745927 | 12/1997 | | WO | WO9917427 | 4/1999 |
| WO | WO9745928 | 12/1997 | | WO | WO9917428 | 4/1999 |
| WO | WO9745929 | 12/1997 | | WO | WO9917429 | 4/1999 |
| WO | WO9745930 | 12/1997 | | WO | WO9917432 | 4/1999 |
| WO | WO9745931 | 12/1997 | | WO | WO9917433 | 4/1999 |
| WO | WO9745932 | 12/1997 | | WO | WO9919963 | 4/1999 |
| WO | WO9745933 | 12/1997 | | WO | WO9919969 | 4/1999 |
| WO | WO9745934 | 12/1997 | | WO | WO9919970 | 4/1999 |
| WO | WO9745935 | 12/1997 | | WO | SE 98/02148 | 6/1999 |
| WO | WO9745936 | 12/1997 | | WO | WO 99/28922 | 6/1999 |
| WO | WO9745937 | 12/1997 | | WO | WO 99/29005 | 6/1999 |
| WO | WO9745938 | 12/1997 | | WO | WO 99/29023 | 6/1999 |
| WO | WO9745939 | 12/1997 | | WO | WO 99/29025 | 6/1999 |
| WO | WO9747067 | 12/1997 | | WO | WO9828930 | 6/1999 |
| WO | WO 98/20598 | 5/1998 | | WO | WO9927546 | 6/1999 |
| WO | WO 98/20602 | 5/1998 | | WO | WO9928919 | 6/1999 |
| WO | WO9820595 | 5/1998 | | WO | WO9928921 | 6/1999 |
| WO | WO9820596 | 5/1998 | | WO | WO9928923 | 6/1999 |
| WO | WO9820597 | 5/1998 | | WO | WO9928924 | 6/1999 |
| WO | WO9820600 | 5/1998 | | WO | WO9928925 | 6/1999 |
| WO | WO9821385 | 5/1998 | | WO | WO9928926 | 6/1999 |

| | | |
|---|---|---|
| WO | WO9928927 | 6/1999 |
| WO | WO9928928 | 6/1999 |
| WO | WO9928929 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

ABB Elkrafthandbok; ABB AB; 1988 ; pp274-276.
Elkraft teknisk Handbok, 2 Elmaskiner; A. Alfredsson et al; 1988; pp 121-123.
High Voltage Cables in a New Class of Generators Powerformer; M. Leijon et al; Jun. 14, 1999; pp1-8.
Ohne Tranformator direkt ins Netz; Owman et al, ABB, AB; Feb. 8, 1999; pp48-51.
Submersible Motors and Wet-Rotor Motors for Centrifugal Pumps Submerged in the Fluid Handled; K.. Bienick, KSB; Feb. 25, 1988; pp9-17.
High Voltage Generators; G. Beschastnov et al; 1977; vol. 48. No. 6 pp1-7.
Eine neue Type von Unterwassermotoren; Electrotechnik und Maschinenbam, 49; Aug. 1931; pp2-3.
Problems in design of the 110-5OokV high-voltage generators; Nikiti et al; World Electrotechnical Congress; Jun. 21-27, 1977; Section 1. Paper #18.
Manufacture and Testing of Roebel bars; P. Marti et al; 1960, Pub.86, vol. 8, pp 25-31.
Hydroalternators of 110 to 220 kV Elektrotechn. Obz., vol. 64, No. 3, pp. 132-135 Mar. 1975; A. Abramov.
Design Concepts for an Amorphous Metal Distribution Transformer; E. Boyd et al; IEEE Nov. 1984.
Neue Wege zum Bau zweipoliger Turbogeneratoren bis 2 GVA, 6OkV Elektrotechnik und Maschinenbau Wien Janner 1972, Heft 1, Seite 1 -11; G. Aichholzer.
Optimizing designs of water-resistant magnet wire; V. Kuzenev et al; Elektrotekhnika, vol. 59, No 12, pp35-40, 1988.
Zur Entwicklung der Tauchpumpenmotoren; A. Schanz; KSB, pp19-24.
Direct Generation of alternating current at high voltages; R. Parsons; IEEE Journal, vol. 67 #393, Jan. 15, 1929; pp1065-1080.
Stopfbachslose Umwalzpumpen- ein wichtiges Element im modernen Kraftwerkbau; H. Holz, KSB 1, pp13-19, 1960.
Zur Geschichte der Brown Boveri-Synchron-Maschinen; Vierzig Jahre Generatorbau; Jan.-Feb. 1931 pp15-39.
Technik und Anwendung moderner Tauchpumpen; A. Heumann; 1987.
High capacity synchronous generator having no tooth stator; V.S. Kildlehev et al; No. 1 1977 pp11-16.
Der Asynchronmotor als Antrieb stopfbcichsloser Pumpen; E. Picmaus; Eletrotechnik und Maschinenbay No. 78, pp153-155, 1961.
Low core loss rotating flux transformer; R. F. Krause, et al; American Institute Physics J.Appl.Phys vol. 64 #10 Nov. 1988, pp5376-5378.
An EHV bulk Power transmission line Made with Low Loss XLPE Cable;Ichihara et al; Aug. 1992; pp3-6.
Underground Transmission Systems Reference Book; 1992; pp16-19; pp36-45; pp67-81.
Power System Stability and Control; P. Kundur, 1994; pp23-25;p. 767.
Six phase Synchronous Machine with AC and DC Stator Connections, Part II:Harmonic Studies and a proposed Uninterruptible Power Supply Scheme; R. Schiferl et al.; Aug. 1983 pp 2694-2701.
Six phase synchronous Machine with AC and DC Stator Connections, Part 1: Equivalent circuit representation and Steady-State Analysis; R. Schiferl et al; Aug. 1983; pp2685-2693.
Reactive Power Compensation; T. Petersson; 1993; pp 1-23.
Permanent Magnet Machines; K. Binns; 1987; pp 9-1 through 9-26.
Hochspannungsaniagen for Wechselstrom; 97. Hochspannungsaufgaben an Generatoren und Motoren; Roth et al; 1938; pp452-455.
Hochspannungsanlagen for Wechselstrom; 97. Hochspannungsaufgaben an Generatoren und Motoren; Roth et al; Spring 1959, pp30-33.
Neue Lbsungswege zum Entwurf grosser Turbogeneratoren bis 2GVA, 6OkV; G. Aicholzer; Sep. 1974, pp249-255.
Advanced Turbine-generators- an assessment; A. Appleton, et al; International Conf. Proceedings, Lg HV Elec. Sys. Paris, FR, Aug.-Sep. /1976, vol. I, Section 11-02, p. 1-9.
Fully slotless turbogenerators; E. Spooner; Proc., IEEE vol. 120 #12, Dec. 1973.
Toroidal winding geometry for high voltage superconducting alternators; J. Kirtley et al; MIT—Elec. Power Sys. Engrg. Lab for IEEE PES;Feb. 1974.
High-Voltage Stator Winding Development; D. Albright et al; Proj. Report EL339, Project 1716, Apr. 1984.
Powerformer ™: A giant step in power plant engineering; Owman et al; CIGRE 1998, Paper 11:1.1.
Thin Type DC/DC Converter using a coreless wire transformer; K. Onda et al; Proc. IEEE Power Electronics Spec. Conf.; Jun. 1994, pp330-334.
Development of extruded polymer insulated superconducting cable; Jan. 1992.
Transformer core losses; B. Richardson; Proc. IEEE May 1986, pp365-368.
Cloth-transformer with divided windings and tension annealed amorphous wire; T. Yammamoto et al; IEEE Translation Journal on Magnetics in Japan vol. 4, No. 9 Sep. 1989.
A study of equipment sizes and constraints for a unified power flow controller; J Bian et al; IEEE 1996.
A test installation of a self-tuned ac filter in the Konti-Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64-70.
Analysis of faulted Power Systems; P Anderson, Iowa State University Press / Ames, Iowa, 1973, pp 255-257.
36-Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* , 1970, pp 6-8.
J&P Transformer Book 11th Edition;A. C. Franklin et al; owned by Butterworth—Heinemann Ltd, Oxford Printed by Hartnolls Ltd in Great Britain 1983, pp29-67.
Transformerboard; H.P. Moser et al; 1979, pp 1-19.
The Skagerrak transmission—the world's longest HVDC submarine cable link; L. Haglof et al of ASEA; ASEA Journal vol. 53, No. 1-2, 1980, pp 3-12.
Direct Connection of Generators to HVDC Converters: Main Characteristics and Comparative Advantages; J.Arrillaga et al; *Electra* No. 149, 08/ 1993, pp 19-37.
Our flexible friend article; M. Judge; *New Scientist*, May 10, 1997, pp 44-48.
In-Service Performance of HVDC Converter transformers and oil-cooled smoothing reactors; G.L. Desilets et al; *Electra* No. 155, Aug. 1994, pp 7-29.
Transformateurs a courant continu haute tension-examen des specifications; A. Lindroth et al; *Electra* No 141, Apr. 1992, pp 34-39.
Development of a Termination for the 77 kV-Class High Tc Superconducting Power Cable; T. Shimonosono et al; IEEE Power Delivery, vol. 12, No 1, Jan. 1997, pp 33-38.
Verification of Limiter Performance in Modern Excitation Control Systems; G. K. Girgis et al; IEEE Energy Conservation, vol. 10, No. 3, Sep. 1995, pp 538-542.
A High Initial response Brushless Excitation System; T. L. Dillman et al; IEEE Power Generation Winter Meeting Proceedings, Jan. 31, 1971, pp 2089-2094.
Design, manufacturing and cold test of a superconducting coil and its cryostat for SMES applications; A. Bautista et al; IEEE Applied Superconductivity, vol. 7, No. 2, Jun. 1997, pp 853-856.
Quench Protection and Stagnant Normal Zones in a Large Cryostable SMES; Y. Lvovsky et al; IEEE Applied Superconductivity, vol. 7, No. 2, Jun. 1997, pp 857-860.
Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840-843.
High Speed Synchronous Motors Adjustable Speed Drives; ASEA Generation Pamphlet OG 135-101 E, Jan. 1985, pp 1-4.
Billig burk motar overtonen; A. Felldin; *ERA* (TEKNIK) Aug. 1994, pp 26-28.
400-kV XLPE cable system passes CIGRE test; ABB Article; ABB Review Sep. 1995, pp 38.
FREQSYN—a new drive system for high power applications;J-A. Bergman et al; ASEA Journal 59, Apr. 1986, pp16-19.
Canadians Create Conductive Concrete; J. Beaudoin et al; *Sience*, vol. 276, May 23, 1997, pp 1201.
Fully Water-Cooled 190 MVA Generators in the Tonstad Hydroelectric Power Station; E. Ostby et al; BBC Review Aug. 1969, pp 380-385.
Relocatable static var compensators help control unbundled power flows; R. C. Knight et al; *Transmission & Distribution*, Dec. 1996, pp 49-54.
Investigation and Use of Asynchronized Machines in Power Systems*; N.I.Blotskii et al; *Elektrichestvo*, No. 12, 1-6, 1985, pp 90-99.
Variable-speed switched reluctance motors; P.J. Lawrenson et al; IEE proc, vol. 127, Pt.B, No. 4, Jul. 1980, pp 253-265.
Das Einphasenwechselstromsystem hoherer Frequenz; J.G. Heft Elektrische Bahnen eb; Dec. 1987, pp 388-389.

Power Transmission by Direct Current;E. Uhlmann;ISBN 3-540-07123-9; Springer-Verlag, Berlin/Heidelberg/New York; 1975, pp 327-328.
Elektriska Maskiner; F. Gustavson; Insititute for Elkreafteknilk, KTH; Stockholm, 1996, pp 3-6—3-12.
Die Wechselstromtechnik; A. Cour' Springer Verlag, Germany; 1936, pp 586-598.
Insulation systems for superconducting transmission cables; O. Toennesen; Nordic Insulation Symposium, Bergen, 1996, pp 425-432.
MPTC: An economical alternative to universal power flow controllers;N. Mohan; EPE 1997, Trondheim, pp 3.1027-3.1030.
Lexikon der Technik; Luger; Band 2, Grundlagen der Elektrotechnik und Kerntechnik, 1960, pp 395.
Das Handbuch der Lokomotiven ( hungarian locomotive V40 1'D'); B. Hollingsworth et al; Pawlak Verlagsgesellschaft; 1933, pp. 254-255.
Synchronous machines with single or double 3-phase star-connected winding fed by 12-pulse load commutated inverter. Simulation of operational behaviour; C. Ivarson et al; ICEM 1994, International Conference on electrical machines, vol. 1, pp 267-272.
Elkrafthandboken, Elmaskiner; A. Rejminger; Elkrafthandboken, Elmaskiner 1996, 15-20.
Power Electronics—in Theory and Practice; K. Thorborg; ISBN 0-86238-341-2, 1993, pp 1-13.
Regulating transformers in power Systems- new concepts and applications; E. Wirth et al; ABB Review Apr. 1997, p 12- 20.
Tranforming transformers; S. Mehta et al; *IEEE Spectrum*, Jul. 1997, pp. 43-49.
A study of equipment sizes and constraints for a unified power flow controller; J. Bian et al; IEEE Transactions on Power Delivery, vol. 12, No. 3, Jul. 1997, pp. 1385-1391.
Industrial High Voltage; F.H. Kreuger; *Industrial High Voltage* 1991 vol. I, pp. 113-117.
Hochspannungstechnik; A. Küchler; Hochspannungstechnik, VDI Verlag 1996, pp. 365-366, ISBN 3-18-401530-0 or 3-540-62070-2.
High Voltage Engineering; N.S. Naidu; High Voltage Engineering ,second edition 1995 ISBN 0-07-462286-2, Chapter 5, pp91-98.
Performance Characteristics of a Wide Range Induction Type Frequency Converter; G.A. Ghoneem; Ieema Journal, Sep. 1995, pp 21-34.
International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1-65.
Design and manufacture of a large superconducting homopolar motor; A.D. Appleton; IEEE Transactions on Magnetics, vol. 19,No. 3, Part 2, May 1983, pp 1048-1050.
Application of high temperature superconductivy to electric motor design; J.S. Edmonds et al; IEEE Transactions on Energy Conversion Jun. 1992, No. 2, pp 322-329.
Power Electronics and Variable Frequency Drives; B. Bimal; IEEE industrial Electronics—Technology and Applications, 1996, pp. 356.
Properties of High Plymer Cement Mortar; M. Tamai et al; *Science & Technology in Japan, No 63* ; 1977, pp 6-14.
Weatherability of Polymer-Modified Mortars after Ten-Year Outdoor Exposure in Koriyama and Sapporo; Y. Ohama et al; *Science & Technology in Japan No. 63*; 1977, pp 26-31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882-1888.

Low-intensy laser-triggering of rail-gaps with magnesium-aerosol switching-gases; W. Frey; 11th International Pulse Power Conference, 1997, Baltimore, USA Digest of Technical Papers, p. 322-327.

U.S. Appl. No. 09/541,523, pending.

* cited by examiner

TRANSFORMER WITH VOLTAGE REGULATING MEANS

BACKGROUND OF THE INVENTION

1. Field of the Invention

The present invention relates to a power or regulating transformer, with a voltage regulator, in a power generation, transmission or distribution system with a rated power ranging from a few hundred kVA up to more than 1000 MVA and with a rated voltage ranging from 3–4 kV and up to very high transmission voltages, 400 kV to 800 kV or higher.

More specifically the invention relates to regulating windings in the power or regulating transformer.

2. Discussion of the Background

The primary task of a power transformer is to act as an electric "gear box", allowing electric energy to flow from one electrical system to another. The electrical systems interconnected with a transformer usually have different voltages but the same frequency. The power transformer, in its simplest form, has only two types of windings, a primary winding and a secondary winding. The transformation ratio is thereby fixed, that is, not possible to regulate. However, there is a need to be able to control the active and reactive power flow between the electrical systems in order to run systems in an efficient mariner or, which is more fundamental, maintain the stability of the systems. Therefore, a regulator, having a regulating winding or windings, are often incorporated in the power transformer, or in a separate regulating transformer connected in series with the power transformer. These regulating transformers are sometimes referred to as "booster transformers". In order to obtain a flexible control over the electrical systems, the active and reactive power flow between the systems is preferably controlled independently of each other. In order to achieve this, the phase-shift between the phase voltages of the systems must be able to be controlled with a variable angle.

In E. Wirth, J-F. Ravot: "Regulation transformers in power systems—new concepts and applications", ABB Review 4/1997, pp. 12–20, a three-phase power transformer with integrated regulator is described. The transformer has three core legs, each leg associated with phases U, V and W respectively. Around each leg a primary winding, a secondary winding, an in-phase control winding, a first quadrature control winding and a second quadrature control winding are wound. The in-phase control winding, the first quadrature control winding and the second quadrature control winding are all regulating windings. The in-phase control winding of each phase is, via a first tap changer common for all three phases, connected in series with the secondary winding of the same phase. This makes it possible to regulate the amplitude of the secondary voltage of each phase, that is, obtain in-phase regulation between the primary and secondary of the transformer. Via a second tap changer, also common for all three phases, the primary winding of phase U is connected in series with the first quadrature control winding of phase V and the second quadrature control winding of phase W. In a similar fashion the primary winding of phase V is connected in series with the quadrature control windings of phases W and U, and the primary winding of phase W is connected in series with the quadrature control windings of phases U and V. The arrangement of the quadrature control windings and the second tap changer is such, that the voltage across the series connected quadrature windings always is perpendicular to the voltage across the primary winding. The requirements for so called quadrature regulation is therefore fulfilled. The phase angle of the primary voltage of each phase can thus be regulated by means of the second tap changer. By combining the in-phase regulation on the secondary side with the quadrature regulation on the primary side of the transformer, it is possible to, for each phase, phase shift the voltage across the transformer and thus accomplish an independent active and reactive power flow control between the primary and secondary side of the transformer.

In N. Mohan: "MPTC: An economical alternative to universal power flow controllers", EPE 97 in Trondheim, pp. 3.1027–3.1032, another regulation system to control the power flow is described. It is made of a three phase regulating transformer where fractions of the primary voltages, by way of secondary windings and via thyristor bridge arrangements, are injected in series with each phase voltage. The secondary windings thus act as regulation windings. By controlling the switches in the thyristor bridges, a linear combination of the voltages over the secondary windings can be added to each phase voltage and each phase voltage can thus be phase-shifted by a variable angle.

The regulator of the three phase transformer by E. Wirth, J-F. Ravot described above, is made of nine regulating windings, three per phase, and two tap changers. The regulator of the regulating transformer by N. Mohan, is made of one regulating winding and one thyristor bridge per phase, totaling three regulating windings and three thyristor bridges. Depending on the regulating voltage, the space occupied by the regulating windings may be quite large due to insulation requirements.

SUMMARY OF THE INVENTION

Irrespectively of whether the regulating windings are incorporated in a power transformer or in a regulation transformer, it is technically and economically favorable to reduce the space occupied by the regulating windings. An objective of the invention is to provide a transformer in which the regulating windings display a compact design. This objective is achieved by a transformer where at least one of the regulating windings at least partly includes a flexible conductor having an electric field containing mechanism.

An example of such a flexible conductor with a field containing mechanism, is a flexible cable of the sort used for power distribution. Such a cable includes a conducting core, a first semiconducting layer provided around said conducting core, a solid insulation layer provided around said first semiconducting layer and a second semiconducting layer provided around said insulation layer. On the condition that the second semiconducting layer is grounded, the cable has the ability to, within itself, contain the electric field arising from the current in the conducting core. The electric stress is thus absorbed within the solid insulation of the cable and there is virtually no electric field outside the second semiconducting layer. In the cable the different layers are firmly attached to each other. Also, the solid insulation layer and the semiconducting layers are made of materials which have almost the same coefficient of expansion. The cable can therefore be subjected to considerable mechanical and thermal stress without the layers separating from each other, forming cavities in-between the layers. This is an important feature, since partial discharges will appear in a cavity if the electric field stress exceeds the dielectric strength of the gas in the cavity. It is especially important that the first semiconducting layer and the solid insulation layer is firmly attached to each other since the electric field stress is largest

DETAILED DESCRIPTION OF THE PREFERRED EMBODIMENTS

Figure 1:
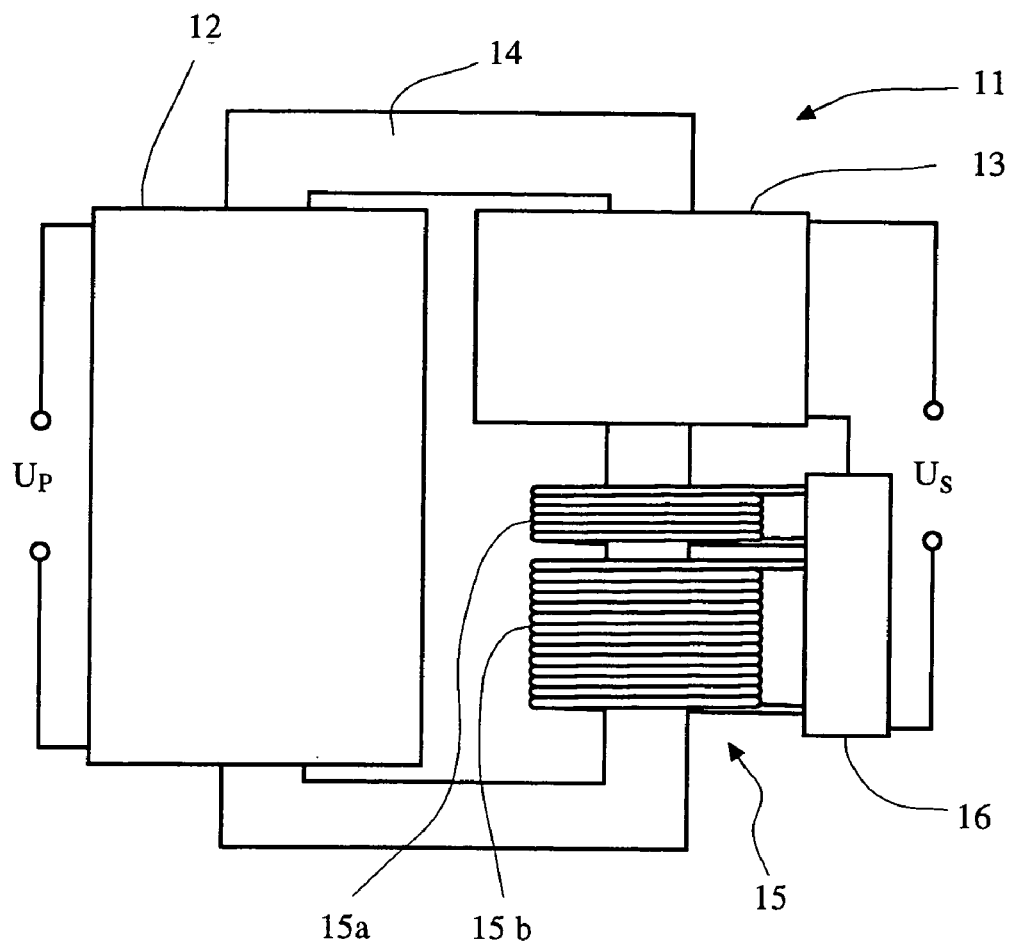
FIG. 1 is a schematic figure of a first embodiment of the invention illustrating the principle of the invention.

A first embodiment of the invention, a single-phase transformer 11 with voltage regulator for voltage control, is schematically shown in FIG. 1 in order to illustrate the principle of the invention. A primary winding 12 and a secondary winding 13 are wound around a transformer core 14. The regulator includes a regulating winding 15 that is wound around the core 14 and a tap changer 16. The regulating winding 15 is divided into two regulating winding parts 15a, 15b, each being connected to the tap changer 16. The secondary winding 13 is via the tap changer 16 connected in series with the regulating winding 15. The transformer 11 interconnects two electrical systems, one with a voltage level corresponding to the primary voltage $U_P$ and one with a voltage level corresponding to the secondary voltage $U_S$. By way of the tap changer 16 and the regulating winding parts 15a, 15b, the secondary voltage $U_S$ can be adjusted in discrete voltage levels and thus the transformer ratio $U_P/U_S$ can be regulated.

Figure 2:
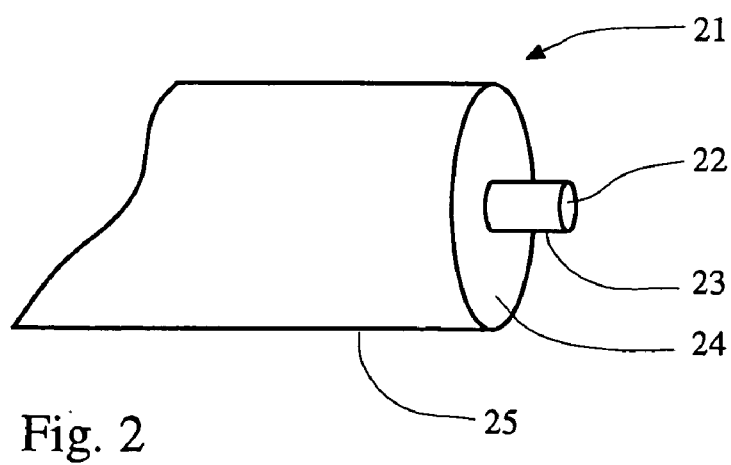
FIG. 2 shows an example of a flexible conductor used in a transformer according to the invention.

In a conventional transformer, transformer oil is usually used to insulate the windings from each other and from the transformer core. In PCT application WO97/45847, a transformer where the primary and secondary windings are made of a flexible conductor with an electric field containing mechanism is presented. An example of a flexible conductor in the form of a cable of the sort presented in WO-97/45847 is shown in FIG. 2. The cable 21 has at least one conductor 22 with a first semiconducting layer 23 disposed around said conductor 22. On the outside of this first semiconducting layer 23 is the main insulation of the cable in the form of a solid insulation 24, and surrounding said solid insulation 24 is a second semiconducting layer 25. On the condition that the second semiconducting layer 25 is grounded the cable has the ability to, within itself, contain the electric field arising from the current in the conductor 22. The electric stress is thus contained within the solid insulation 24 of the cable and there is virtually no electric field outside the second semiconducting layer 25.

A flexible conductor with the electric field containing mechanism, for example of the sort shown in FIG. 2, is used in the regulating winding of the regulating transformer shown in FIG. 1. Since no electric field is to be found outside the flexible conductor of the regulating winding 15, the winding may be formed without having to consider the electric field distribution. A technically favorable design is thus achieved. The primary winding 12 and the secondary winding 13 are also made of a flexible conductor having the electric field containing mechanism and thus no transformer oil is needed for insulation. If, in addition, the tap changer 16 is e.g. of the electronic or air insulated type, oil in the transformer can be avoided altogether, which is economically as well as environmentally favorable.

Figure 3:
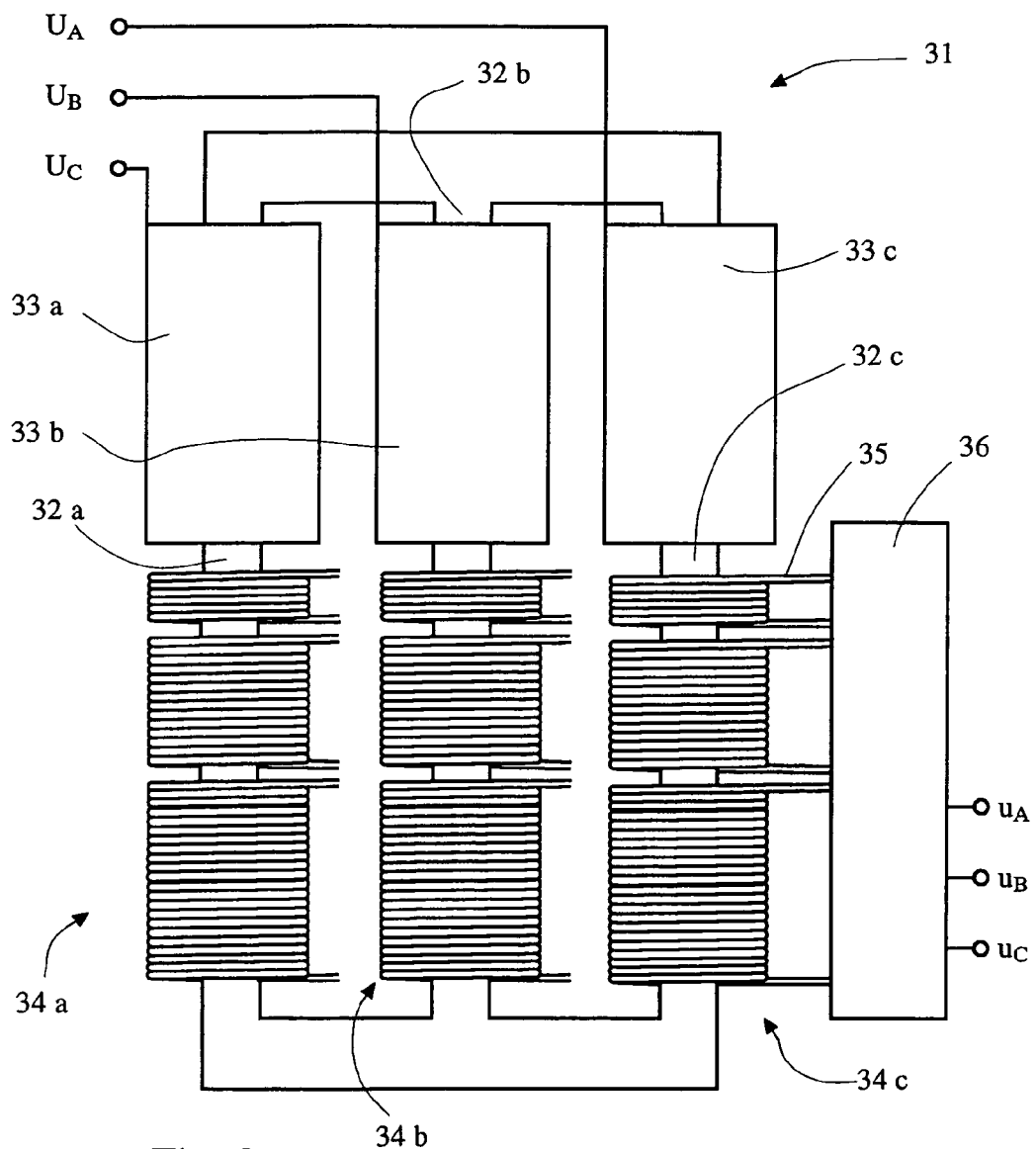
FIG. 3 is a schematic illustration of a second embodiment of the invention.
Figure 4:
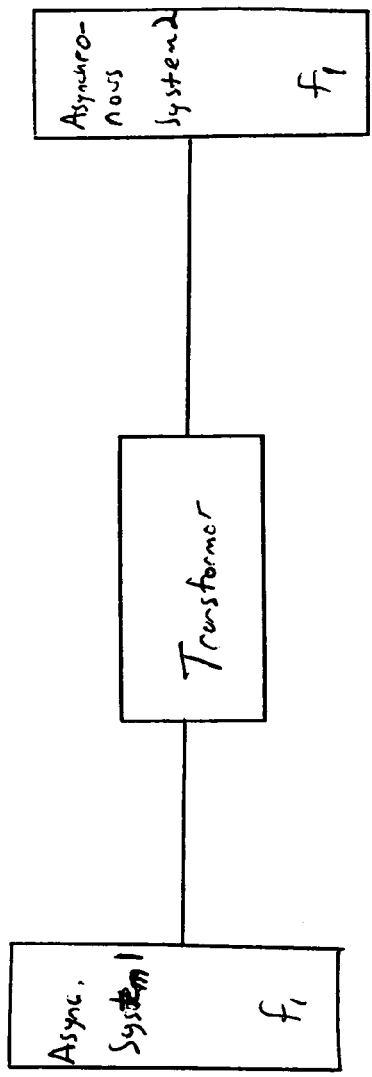
FIG. 4 is a figure showing a transformer according to the present invention that connects between two asynchronous systems with a same nominal frequency.
Figure 5:
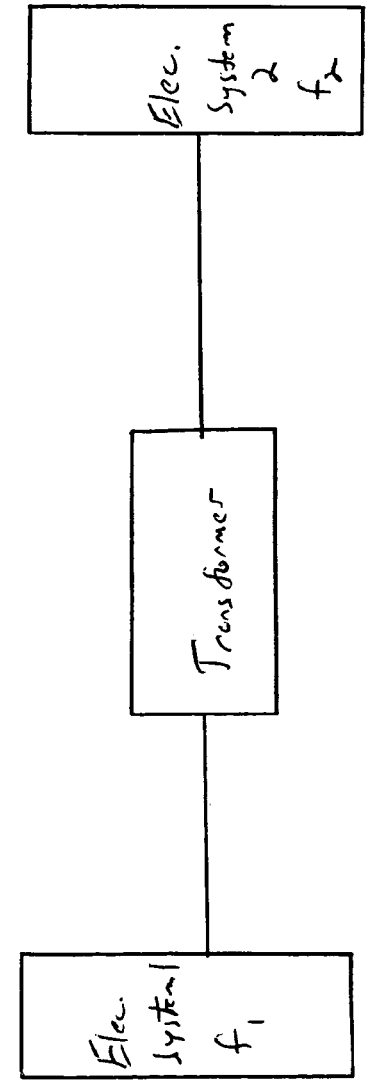
FIG. 5 shows a transformer according to the present invention that connects two electric systems with a different nominal frequency.

In FIG. 3 a second embodiment of the invention is schematically illustrated. It is a three-phase regulating transformer 31 with a voltage regulator which provides phase angle regulating possibilities between the input and output side of the transformer. The transformer 31 connects a first electrical system with phase voltages $U_A$, $U_B$, $U_C$, to a second electrical system with phase voltages $U_A$, $U_B$, $U_C$. The transformer 31 has three core legs 32a, 32b, 32c made of a magnetizable material. On each core leg, a primary winding 33 and a regulating winding 34 is wound. Normally the windings on each core leg are wound one outside the other.

For clarity reasons however, the windings on each core leg in FIG. 3 are shown one after the other. The primary winding 33 and the regulating winding 34 on each core leg 32 are made of a flexible conductor with an electric field containing mechanism 35. The conductor 35 ay for example be a cable of the sort described in FIG. 2. The regulating windings 34 are divided into a number of regulating winding parts. Each regulating winding part is, by way of the same flexible conductor that forms the regulating winding part, connected to a switching unit 36. For clarity reasons this connection is, in FIG. 3, only shown for the regulating winding 34c of one the core legs 32c. However, the regulating winding parts of the regulating windings 34a, 34b of the other two core legs 32a, 32b are connected to the switching unit 36 in the same fashion. Each regulating winding 34 is divided into an appropriate number of regulating winding parts. Preferably, the regulating winding parts on each core leg have turn ratios following $1:3:9 \ldots 3^{N-1}$. In the switching unit 36, the regulating winding parts are connected to an electronic switch system. Via the switch system, suitable combinations of the regulating winding parts are connected in series to obtain the desired phase voltages $U_A$, $U_B$, and $U_C$. With the arrangement it is possible to phase-shift the phase voltages $U_A$, $U_B$, and $U_C$ compared to $U_A$, $U_B$, and $U_C$ up to ±60°. By performing a series of phase-shifting operations, one after the other, it is possible to shift the voltages $U_A$, $U_B$ and $U_C$ a whole 360°. By continuously performing phase-shifting operations, it is possible to link two asynchronous electric systems with the same nominal frequency or systems with relatively small frequency differences.

Since each regulating winding 34 is made of a flexible conductor with the electric field containing mechanism 35, and since the electrical current in each regulating winding is led to the switching device also in a flexible conductor, the voltage regulator of the transformer can be designed without having to consider the electric field distribution. The switching unit 36 can be placed close to, or even in physical contact with, the regulating windings 34. Alternatively, it is possible to place the switching unit 36 at a distance from the regulating windings 34 or indeed from the rest of the transformer, utilizing the same flexible conductors 35 that make up said windings 34 to connect the windings 34 to the switching unit 36. Since the primary windings 33 are also made of a flexible conductor having electric field containing means, the regulating transformer can be made oil-free 35 which is economically as well as environmentally favorable.

The voltage regulating arrangement described above teaches how to use a flexible conductor in a winding in order to bring about a power or regulating transformer according to the invention. It is understood, however, that other power or regulating transformer embodiments involving voltage regulating mechanisms having a flexible conductor with an electric field containing mechanism, are possible within the scope of the invention.

What is claimed is:

1. A transformer with voltage regulation features comprising:
    at least one regulating winding that includes a flexible conductor having an electric field containing mechanism, wherein
    said flexible conductor includes a cable having a conductor, a first semiconducting layer having semiconducting properties firmly attached around said conductor, a solid insulation layer firmly attached around said first layer and a second semiconducting layer having semiconducting properties firmly attached around said insulating layer, said first and second semiconducting layers and said solid insulation layer having substantially same coefficients of expansion.

2. A transformer according to claim 1, further comprising: an electronic tap changer.

3. A transformer according to claim 1, further comprising a mechanical air-insulated tap changer.

4. A transformer according to claim 1, wherein:
    the transformer being oil-free.

5. A transformer according to claim 1, further comprising: a voltage regulating means with a phase-shifting capacity.

6. A transformer according to claim 5, wherein:
    a range of the phase-shift capacity is 360.

7. A transformer according to claim 6, wherein:
    the transformer being configured to connect two asynchronous systems with a same nominal frequency.

8. A transformer according to claim 6, wherein:
    the transformer being configured to connect two electric systems with a different nominal frequency.

* * * * *